Jan. 23, 1968  LEE ROY BROWN ETAL  3,365,724
DUAL PRESENTATION OSCILLOGRAPHIC RECORDER
Filed Dec. 20, 1965  2 Sheets-Sheet 1

INVENTORS
LEE ROY BROWN
EDWARD L. BOGARD
BY
*Russell E. Schloff*
ATTORNEY

Jan. 23, 1968  LEE ROY BROWN ETAL  3,365,724
DUAL PRESENTATION OSCILLOGRAPHIC RECORDER
Filed Dec. 20, 1965  2 Sheets-Sheet 2

INVENTORS
LEE ROY BROWN
EDWARD L. BOGARD
BY
Russell E. Schloff
ATTORNEY

United States Patent Office 3,365,724
Patented Jan. 23, 1968

3,365,724
DUAL PRESENTATION OSCILLOGRAPHIC RECORDER
Lee Roy Brown and Edward L. Bogard, Houston, Tex., assignors to Dresser Systems, Inc., a corporation of Delaware
Filed Dec. 20, 1965, Ser. No. 514,812
9 Claims. (Cl. 346—109)

ABSTRACT OF THE DISCLOSURE

Dual presentation, such as variable density—variable amplitude or variable area—variable amplitude, is accomplished by an aperture member, having a plurality of different apertures therein, being placed between the single light source and the galvanometer mirrors. At least one of the apertures has a dual opening to pass a dual bundle of light bands. An optics system having a flat mirror and a concave mirror reflects the light bands from the galvanometer mirrors to a light-sensitive recording medium.

This invention relates to a novel galvanometer-type, oscillographic recorder for simultaneously producing a multiple channel recording of one or more modes of signal presentation.

Since the invention is particularly useful in reflection seismic exploration, an illustrative application will be briefly described and the present invention will be considered in connection therewith. However, the present invention is equally applicable to other arts and fields in which a time scale record of transient signal intensity is desired.

Briefly, in making reflection seismic surveys, a seismic disturbance is initiated and the reflected seismic waves are detected at a plurality of points spread out in a selected pattern by sensitive instruments, usually geophones, which convert the seismic energy to electrical signals of comparable intensity. These electrical signals are amplified and recorded.

In order that the seismic signals can be examined to determine the characteristics of the area under investigation, a visual presentation is usually made. The visual presentation may either be made directly in the field by the use of an oscillographic recorder or may be made later from a reproducible record made in the field.

Galvanometer-type, oscillographic recorders, whether field recorders or part of an office playback system, generally have a bank of mirror galvanometers, one for each channel. Each mirror galvanometer oscillates about an axis by an amount dependent upon the magnitude of the electrical signal it receives from its geophone. The mirror galvanometers are positioned to receive light energy from an appropriate light source and each mirror galvanometer reflects a portion of the light source pattern depending upon its position which in turn is controlled by the signal it receives. Positioned between the galvanometer block and the record member are the necessary optics for directing and focusing the light reflected by the mirror galvanometers. A portion of such optics is a series of individual apertures, which determines the width of each channel and prevents overlapping of individual channels. As a rule, the individual apertures are fixed and joined together into a channel block. L. R. Brown's copending applications, Ser. No. 348,605 filed Mar. 2, 1964, now U.S. Patent No. 3,235,876 and Ser. No. 440,498 filed Mar. 17, 1965, now U.S. Patent No. 3,343,172, disclose apparatus and method for eliminating the channel block with its fixed apertures and utilizing instead a single adjustable aperture, which makes it possible to change the width of each channel and the width of the over-all presentation in the facile manner. This development has materially improved the universality of galvanometer-type, oscillographic recorders. However, in making wide presentations, there was some difficulty encountered in achieving uniformly sharp focus across the width.

It is an object of the present invention to improve upon the optics of the single adjustable aperture type, galvanometer oscillographic whereby uniformly sharp focusing of the entire visual presentations may be achieved.

The problem of achieving sharp focus throughout a wide presentation not only occurs in multi-channel display where the light bands of the end channels hit the final stage optics at an angle, but also in single channel oscillographic recorders where there are wide sweeps. The present invention is also useful in such instances.

The visual presentation produced by oscillographic recorders used in seismic work may be in several modes. The most common is probably variable amplitude, or, as it is commonly known, "wiggle trace," wherein the record is in the form of an oscillatory line whose amplitude of oscillation is proportional to the intensity of the electrical impulses which, in turn, vary in accordance with the intensity of the reflected wave at the geophone. Another mode is variable area, which is a selected portion of the variable amplitude signal presented as a shaded area of equal intensity. Another mode is variable density, where the intensity of an area of constant width is proportional to the intensity of the signal.

Originally, it was possible to make only one mode of presentation at a time with an oscillographic recorder; however, U.S. Patent No. 3,129,999 of L. R. Brown et al. dated Apr. 21, 1964, discloses an oscillographic recorder in which the wiggle trace may be simultaneously superimposed on either variable area or variable density. While this device used the same galvanometer for the superimposed wiggle trace, it did require two light sources.

It is another object of the present invention to provide a galvanometer-type, oscillographic recorder capable of simultaneously recording a dual seismic presentation such as variable density or area with wiggle superimposed from a single light source.

It is still another object to provide a single adjustable aperture, galvanometer-type oscillographic recorder capable of simultaneously recording multiple channels of seismic data including wiggle superimposed upon either variable area or density as well as selectively recording the various modes individually in all instances using a single light source.

It is a further object to provide improved optics for a single adjustable aperture, galvanometer-type, oscillographic recorder capable of simultaneously recording multiple channels of dual seismic presentation wherein all channels may be brought into sharp focus at the recording medium.

It is still a further object to provide an improved galvanometer-type, oscillographic recorder which will simultaneously record multiple channels of transient signal data and selectively present various modes of presentation including dual presentations in a clear, distinct manner.

The improved galvanometer-type, oscillographic recorder of the present invention has a light sensitive record, which receives its indications from light reflected by a plurality of mirror galvanometers. The record section and mirror galvanometer section are similar to many of the prior art oscillographic recorders. The present recorder, although it can produce two modes of presentation, has a single light source which can project a dual light source pattern to all of the mirror galvanometers. An aperture member positioned between the light source and the mirror galvanometers selectively provides different types of light source patterns as well as dual light source patterns. The present recorder also utilizes, in its preferred form, the single adjustable aperture between the galvanometer and record section which is fully disclosed in the previously mentioned L. R. Brown applications, Ser. Nos. 348,605 and 440,498. Between the single aperture and the record, improved optics are positioned which permit clear focusing of the entire presentation even though the light band of the end channels hit the optics at a considerable angle in wide presentations. These optics are formed of a concave cylindrical mirror which receives the images from the single aperture and a flat mirror positioned to receive the reflected images and direct them to the recording medium.

The novel features which are believed to be characteristic of the invention, both as to its organization and method of operation, together with further objects and advantages thereof, will be better understood from the following descriptions considered in connection with the accompanying drawings in which a presently preferred embodiment of the invention is illustrated by way of example. It is to be understood, however, that the drawings are for the purpose of illustration and description only, and are not intended as a definition of the limits of the invention.

It is expressly understood that, although seismic exploration is used as an application in which the present invention is particularly desirable, the invention is not limited thereto and may be used in any application of an oscillographic recorder in which it is desirable to obtain an unlimited number of various sized photographic presentations of oscillatory signals. It is to be understood that the present invention may be utilized to obtain a single trace as well as multiple traces.

The term "transient input signals" is used throughout the specification in reference to those signals which are to be recorded upon a multi-channel, time-scale record. Such input signals in seismic exploration may be the result of a previously recorded record, or may be directly transmitted from field detection units, such as geophones or other types of seismic detectors.

Figure 1:
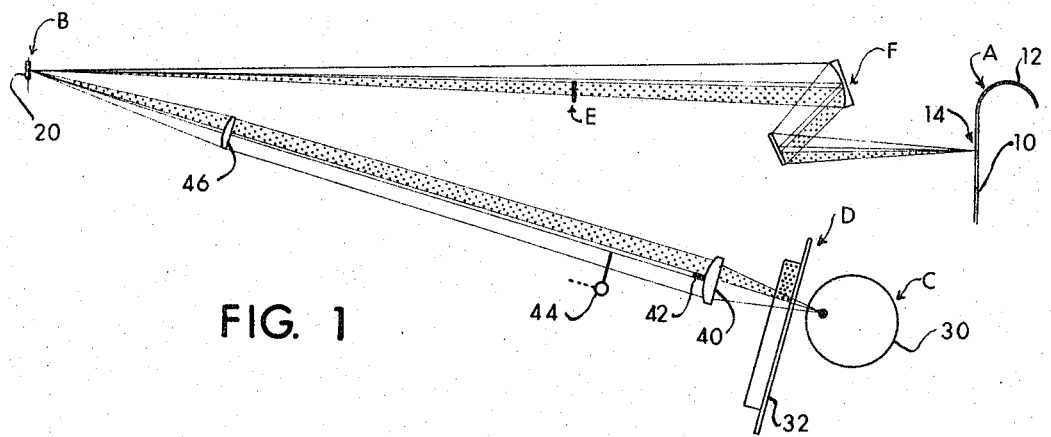
FIGURE 1 is a schematic vertical sectional view showing the path of light from the light source to the recording medium.

Referring now to the drawings, and particularly FIGURE 1, the presently preferred embodiment of the present invention includes in general terms: a light-sensitive recording section A, a galvanometer mirror section B, a light source section C, a lamp aperture section D, a stop-aperture mechanism E, and image forming optics F, all of which may be contained in a housing (not shown).

The light-sensitive recording section A includes a recording surface 10 across which a strip of photo-sensitive recording medium 12, such as photographic film or a strip of photo-sensitive paper, moves. The recording medium 12 is positioned in a substantially vertical plane on the recording surface 10 and at a predetermined distance from the galvanometer mirror section B. The recording medium 12 may be carried across the recording surface 10 by means well known in the art. The recording medium 12 is moved at a constant rate of speed in a vertical direction, therefore signals impressed on the recording medium 12 at a recording station 14, which is vertically stationary, will form a time scale record of such signals. The recording channel has length in the direction of motion of the recording medium 12 and has width in the direction transverse thereto. If the oscillographic recorder is incorporated as part of office playback equipment, the light-sensitive recording section A may be comprised of a large revolving drum to which the recording medium 12 is attached, as is well known in the art. In such case, there will still be, in effect, a recording medium 12 which will pass a vertically stationary recording station 14 in a substantially vertical plane.

Galvanometer mirrors are utilized to transform transient input signals to visually recordable signals of magnitude proportional to the intensity of the input signals. The galvanometer section B is positioned a predetermined distance from the recording section A and is formed of a plurality of light reflecting means or galvanometer mirrors 20, of the cylindrical type, arranged in side-by-side relation, with one mirror galvanometer for each channel. Each mirror galvanometer 20 is affixed to a movable coil as is well known in the art. The coil is rotated by an amount proportional to the electrical signal impressed upon it. The intensity of the electrical signal is determined by the intensity of the input signal which, in the case of seismic exploration, is proportional to the intensity of the seismic wave received by its respective geophone. Thus, each mirror is rotated about the axis of the coil through an arc which is proportional to the input signal for the respective channel. The galvanometer mirrors 20 are positioned such that the axis of each coil is substantially parallel to the plane of the recording surface 10 at the recording station 14, or is otherwise so positioned that light impinges upon the mirror 20 from the light source C and is reflected to the recording station 14 on the recording medium 12. The image reflected by each mirror galvanometer 20 oscillates transverse to the direction of movement of the recording medium 12 at the recording station 14. As the mirror galvanometer 20 moves about its axis the light reflected thereby is deflected in a horizontal direction or a direction transverse to the direction of movement of the recording medium 12.

Figure 3:
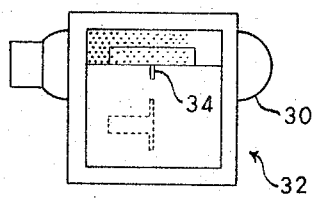
FIGURE 3 is a schematic view showing the light source and aperture member with the aperture indexed for producing variable density with wiggle superimposed.
Figure 4:
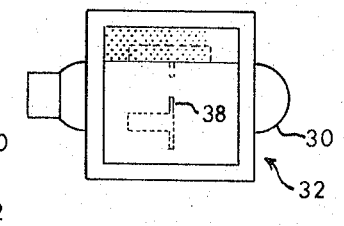
FIGURE 4 is a view similar to FIGURE 3 indexed for wiggle presentation.
Figure 5:
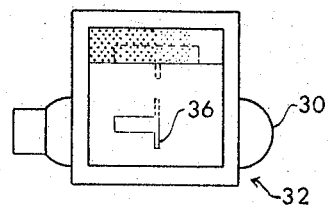
FIGURE 5 is a view similar to FIGURE 3 indexed for variable area with wiggle superimposed.

The light source C is a long straight filament lamp 30. Positioned directly about and in close proximity to the lamp 30 is the lamp aperture section D formed of a sliding lamp aperture mechanism 32 which, as is illustrated in FIGURES 3, 4, and 5, contains three different apertures; namely, a variable density-wiggle aperture 34, a variable area-wiggle aperture 36 and a variable amplitude aperture 38. Depending upon which mode of presentation is to be recorded, the appropriate aperture will be indexed across the filament of the lamp 30. The aperture will determine the type of light source pattern transmitted. As can be seen in FIGURE 3, the variable density-wiggle aperture 34 is formed of a gradated glass filter which uniformly changes in light transmission characteristics throughout its length, and a narrow slot for the wiggle trace; accordingly, the aperture 34 will transmit a dual bundle of light. One will be a wide band of gradated intensity and the other will be a narrow band of uniform intensity. The variable area-wiggle aperture 36 is formed of an opening having a piece of clear glass and a narrow slot for the wiggle trace, see FIGURE 5; accordingly, this aperture will also transmit a dual bundle. One will be a wide band of uniform intensity and the other will be a narrow band of uniform intensity. The variable amplitude (wiggle) aperture 38 is a narrow slot, see FIGURE 4, which transmits a single band of uniform intensity.

Assuming that it is desired to make a variable area-wiggle presentation, the variable area-wiggle aperture 36 would be positioned over the filament of the lamp 30, see FIGURE 5. The aperture 36 has two openings, one is a clear area of substantial width and the other is a clear narrow slot projecting from one edge of the large clear area; see FIGURE 5. Accordingly, a broad light band of uniform intensity and a narrow light band of uniform intensity will be transmitted toward the mirror galvanometer section C. The dual bundle of light bands, after passing through the variable area-wiggle aperture 36, pass through a first cylindrical lens 40 which gathers and collimates the rays of the light bands. Adjacent the lens 40 is a thin metal strip 42 which acts as a light band separator and is positioned to distinctly separate the broad light band from the narrow light band to eliminate spillover or clip interference at the stop aperture E.

To make possible the presentation of variable area or variable density without wiggle superimposed, a wiggle trace shutter 44 is positioned in the light path following the light band separator 42. The shutter 44 may be positioned to pass or eliminate the wiggle trace portion of the dual variable area or density bundle. A second cylindrical lens 46 directs the light source pattern onto the galvanometer mirror section B.

Figure 6:
FIGURE 6 illustrates a schematic view for each of the three modes shown in FIGURES 3-5 respectively of the light source pattern viewed by each of the mirror galvanometers.

The optics of the light source section C are so arranged that each mirror galvanometer 20 of the galvanometer mirror section B uniformly receives rays of light for transmission to the light-sensitive recording section A. FIGURE 6 illustrates the different types of light source patterns illuminating each mirror galvanometer 20. In the case of variable amplitude and variable area, the light source pattern is of uniform intensity whereas in the case of variable density the light source pattern is uniformly gradated.

Figure 2:
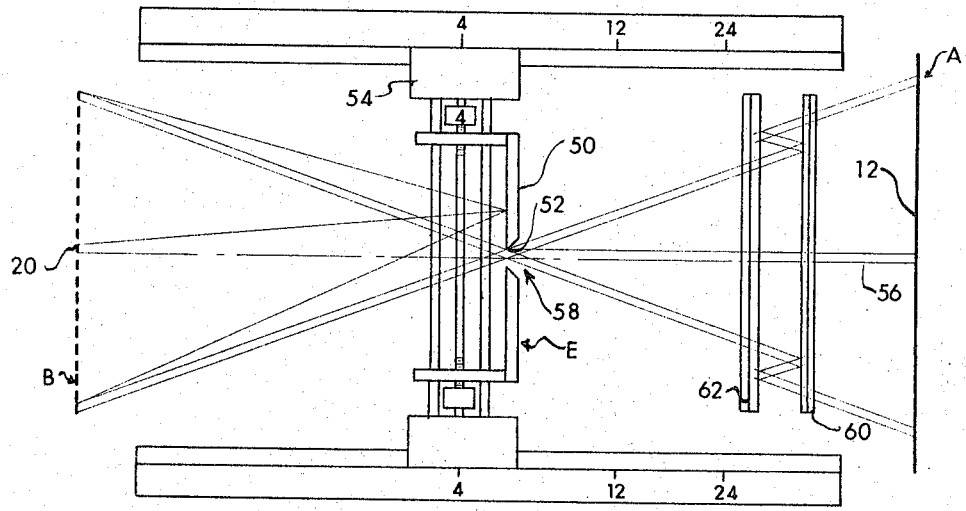
FIGURE 2 is a schematic plan view showing the path of light rays from the mirror galvanometers to the recording medium.

Positioned between the mirror galvanometer section B and the light-sensitive recording section A is the stop aperture mechanism E, which is formed of two adjustable blades 50, having sharp edges 52 mounted on a carriage 54, see FIGURE 2. The blades 50 are symmetrically centered on a reference center line 56 which extends from the center of the galvanometer section B to the center of the light-sensitive recording section A. The carriage 54 is so constructed that the blades 50 move simultaneously in relation to the reference center line 56 so that an aperture opening 58 is formed symmetrically of the reference center line 56. The opening 58 of the stop aperture mechanism E determines the portion of each bundle of light reflected by the individual galvanometer mirrors 20 which will be transmitted onto the light-sensitive recording section A. Increasing or decreasing the width of the opening 58 of the stop aperture E will regulate the width of each individual channel of variable density and variable area. As can be seen in FIGURE 1, the narrow band for the wiggle trace passes over the top of the stop aperture E without restriction. In addition to being adjustable in width, the stop aperture mechanism E is also movable longitudinally along the reference center line 56. The longitudinal adjustment regulates the over-all width of the presentation. Accordingly, the stop aperture E permits adjustment of the over-all size presentation, as well as the size of each individual trace. However, as a rule, the over-all width will be keyed to the number of channels per inch or else there will be space between channels.

Figure 7:
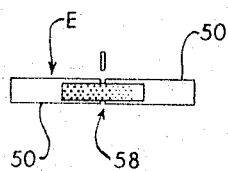
FIGURE 7 illustrates a schematic view for each of the three modes shown in FIGURES 3-5, respectively, of a partially focused image of the light source pattern appearing in the plane of the single aperture assembly produced by each of the mirror galvanometers.
Figure 7:
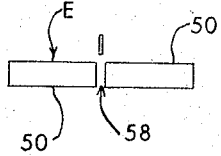
Figure 7:
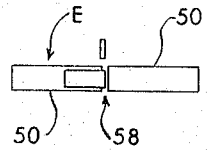

FIGURE 7 illustrates the light source pattern appearing in the plane of the single aperture E for each of the three modes of presentation.

Seismic visual presentations usually vary from 24 channels per inch to 4 channels per inch. When a presentation of 4 channels per inch is made, on a 24 channel recorder, the presentation is 6 inches in width and the bands of light from the end channels hit the final stage optics at an angle. This is particularly true in single aperture recorders where the bands of light cross over at the single aperture opening. If a lens is used for the final stage optics, it has been found that there is a tendency for the images formed by the end channels to be blurred if the image for the center channel is in sharp focus. In order to bring the images of all of the channels into sharp focus on the recording medium, the bands of light transmitted by the single aperture E in the present invention is projected onto a concave cylindrical mirror 60 and then reflected back onto a flat mirror 62 positioned relative to the concave cylindrical mirror 60 which projects the bands of light onto the recording medium 12; see FIGURES 1 and 2. Although the bands of light for the end channels hit the concave mirror 60 at a different angle than the band of light for the center channel, the effective focal length of the concave mirror 60 is altered by the oblique angle of incidence proportional to the increased path length of the bands of light of the end channels. It has been found that with the use of such optics F that the image produced by each individual channel can be brought into sharp focus at the recording medium 12 resulting in a sharp multiple channel visual presentation.

Although the preferred embodiment shows that the light reflected from the light reflecting means B first contacts the concave cylindrical mirror 60 and then are reflected onto the flat mirror 62 for transmission to the recording medium 12, the position of the mirrors may be reversed with the light from the light reflecting means B first striking the flat mirror and then being reflected onto the concave cylindrical mirror 60 for focusing and transmission to the recording medium 12.

Not only are such optics useful in multi-channel recorders but they may also be used where there are wide sweeps of reflected light which would strike the final focusing optics at varying angles of incidence.

Thus, it can be seen that an oscillographic recorder has been disclosed and described which permits facile, selective recording of multiple channel variable amplitude, variable density, variable area, and variable density or area with wiggle superimposed, all with a single light source. The recorder permits incremental adjustments of channel width over a fairly large range, with a minimum of down time for changeover. Having a minimum of down time is particularly advantageous for oscillographic recorders incorporated as part of office playback equipment inasmuch as a considerable amount of equipment may have to remain idle during changeover. Further, the recorder incorporates improved final stage multimember optics which result in a sharply focused presentation throughout the entire width thereof.

While a preferred embodiment of the invention has been illustrated and described, it is to be understood that the invention is capable of modifications such as come within the scope of the appended claims.

We claim:

1. A galvanometer-type, oscillographic recorder for recording a signal presentation from an electrical signal, said recorder comprising:
   a recording station;
   a light-sensitive recording medium positioned at said recording station;
   a light source;
   a light source aperture member having a plurality of different apertures which may be selectively aligned with the light source, at least one of the apertures having a dual opening whereby a dual bundle of light bands results;
   a pivotally mounted light reflecting means positioned to receive the light source pattern transmitted by said aperture member and to reflect said light source pattern toward said recording medium;
   means to oscillate said light reflecting means in response to electrical signals whereby the reflected light source pattern is directed toward the recording medium in varying angles, and
   multimember optical means between the light reflecting means and the recording medium for focusing an image onto the recording medium, said optical means maintaining the image in focus on the recording medium regardless of the angle of incidence at which the reflected light source pattern strikes said optical means.

2. The recorder specified in claim 1 in which there is a light band separator positioned in the light path between the light source aperture member and the light reflecting means to separate the dual bundle into separate, distinct light bands.

3. The recorder specified in claim 2 in which there is a shutter to exclude or pass one of the light bands from the dual bundle.

4. A galvanometer-type, oscillographic recorder for selectively recording from seismic wave energy variable density with wiggle superimposed, variable area with wiggle superimposed or variable area, variable density or wiggle singly, said recorder comprising:
  a recording station;
  a light-sensitive recording medium positioned at said recording station;
  a light source;
  a light source aperture member having a plurality of apertures positioned adjacent the light source, said member being movable whereby the light energy transmitted by the light source may be selectively changed;
    the variable area with wiggle superimposed and the variable density with wiggle superimposed apertures forming dual bundles of light bands, one for variable area or variable density and the other for wiggle,
  a plurality of pivotally mounted light reflecting means positioned to receive light from said light source as transmitted by said aperture member and said shutter member and to reflect light toward said recording medium;
  means to oscillate said light reflecting means in response to electrical signals generated by a train of seismic wave energy;
  stop aperture means positioned between the light reflecting means and the recording station, a portion of the reflected light from the light reflecting means representing variable area or variable density passing through said stop aperture, and the light band for wiggle by-passing the stop aperture means; and
  optical means between the stop aperture and the recording medium focusing the bands of light onto the recording medium in such a manner that the bands of light from the end channels as well as the band of light from the center channel can be brought into sharp focus.

5. The recorder specified in claim 4 in which there is a light band separator between the lamp aperture member and the shutter member to divide the dual bundles of light into two distinct light bands.

6. The recorder specified in claim 5 in which the stop aperture is formed of two adjustable blades which make a single symmetrical opening at which point the light bands representing variable area or variable density as reflected by the light reflecting means cross over.

7. The recorder specified in claim 6 in which the optical means is formed of a concave cylindrical mirror and flat mirror, the mirrors being so positioned relative to each other that one mirror receives the reflected light patterns from the light reflecting means and the other mirror projects the reflected light source patterns from the first mirror onto the recording medium as sharply focused images.

8. The recorder specified in claim 7 in which the concave cylindrical mirror receives the reflected light from the light reflecting means and the flat mirror is positioned relative to the concave cylindrical mirror to receive the light reflected by the concave mirror and direct it toward the recording station.

9. The recorder specified in claim 7 in which there is a shutter means located in the light path subsequent to the aperture means positionable to pass or exclude one of the light bands from the dual bundles.

References Cited
UNITED STATES PATENTS

| | | | |
|---|---|---|---|
| 2,613,127 | 10/1952 | Geiser | 346—109 |
| 3,129,999 | 4/1964 | Brown et al. | 346—109 |
| 3,235,876 | 2/1966 | Brown | 346—109 |
| 3,276,030 | 9/1966 | Stauffer | 346—109 |

RICHARD B. WILKINSON, *Primary Examiner.*

J. W. HARTARY, *Assistant Examiner.*